United States Patent Office 3,087,925
Patented Apr. 30, 1963

3,087,925
PROCESS FOR THE PRODUCTION OF 12β-METHYL-Δ$^{5,17(20)}$-PREGNADIENE-11 OXYGENATED-3-KETAL DERIVATIVES
Burton G. Christensen, Rahway, Ralph F. Hirschmann, Scotch Plains, and John M. Chemerda, Metuchen, N.J., assignors to Merck & Co., Inc., Rahway, N.J., a corporation of New Jersey
No Drawing. Filed Aug. 7, 1958, Ser. No. 753,641
2 Claims. (Cl. 260—239.55)

This invention is concerned generally with novel steroid compounds and with processes of preparing the same, more particularly, it relates to 12β-alkyl-11-oxygenated steroids of the pregnane series unsaturated in ring A. It relates also to novel processes for producing 12β-alkyl steroids.

The new products of our invention may be represented by the structural formula—

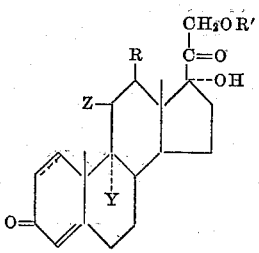

wherein R is alkyl, R' is hydrogen or acyl, Y is hydrogen halogen, and Z is hydroxy or keto. The broken line between carbon atoms 1 and 2 indicate that a double bond may be represented in this position.

The 12β-alkyl-steroids produced in accordance with the present invention possess anti-inflammatory activity, and are effective for the treatment of arthritis and related diseases since they can be administered for their cortisone-like action and minimize undesired side effects.

In preparing our novel chemical compounds, the starting material utilized is alkyl 12α-alkyl-3-ethylenedioxy-11β-hydroxy-5,17(20)-pregnadien 21-oate which may be represented as follows:

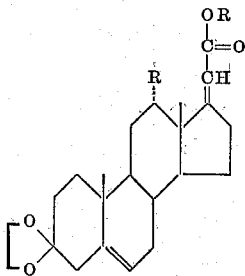

wherein R may be the same or different alkyl groups.

The alkyl 12α-alkyl-3-ethylenedioxy-11β-hydroxy-5,17 (20)-pregnadien 21-oate used as a starting material for the present invention is prepared by hydrolyzing 3α-acyloxy-12α-halo-11,20-pregnanedione to form 12α-halo-3α-hydroxy-11,20-pregnanedione.

The latter compound is then reacted with an oxidizing agent and the 12α-halo-3,11,20-pregnanetrione, thus formed, is reacted with ethylene glycol in the presence of an acid catalyst to obtain 12α-halo-3,20-bis-[ethylenedioxy]-11-pregnanone. This latter compound is then reacted with lithium borohydride to form 12α-halo-3,20-bis-[ethylenedioxy]-11β-hydroxypregnane and the latter compound is reacted with base to yield 11β,12β-epoxy-3,20-bis-[ethylenedioxy]-pregnane. This compound may be caused to react with dialkylmagnesium and hydrolysis of the 12α-alkyl-3,20-bis-[ethylenedioxy]-11β-hydroxypregnane thus obtained with acid such as dilute sulfuric acid in methyl alcohol results in the formation of 12α-alkyl-11β-hydroxy-3,20-pregnanedione which is reacted with a halogenating agent to form 12α-alkyl-4-halo-11β-hydroxy-3,20-pregnanedione.

Dehydrohalogenation of this latter compound with a reagent such as collidine or lithium chloride in dimethylformamide results in the formation of 12α-alkyl-11β-hydroxy-4-pregnene-3,20-dione and the 21-glyoxylate ester is prepared by reacting 12α-alkyl-11β-hydroxy-4-pregnene-3,20-dione with a dialkyl oxalate to form alkyl 12α-alkyl-11β,21 - dihydroxy-4-pregnene-3,20-dione 21-glyoxylate. Reacting the alkyl 12α-alkyl-11β,21-dihydroxy-4-pregnene-3,20-dione 21-glyoxylate with a halogen results in the formation of alkyl 12α-alkyl-21,21-dihalo-11β-hydroxy-4-pregnene-3,20-dione 21-glyoxylate. The latter compound, namely, alkyl 12α-alkyl-21,21-dihalo-11β-hydroxy-4-pregnene-3,20-dione 21-glyoxylate, is reacted with sodium methoxide and then with a diazoalkane compound to form alkyl 12α-alkyl-11β-hydroxy-3-oxo-4,17(20)-pregnadien-21-oate which is the starting material employed in the present invention.

It has been found that the above 12α-alkyl-3-ethylenedioxy-11β-hydroxy-5,17(20)-pregnadien-21-oates may be caused to react with an oxidizing agent such as chromimum trioxide in pyridine to form alkyl 12α-alkyl-3-ethylenedioxy-5,17(20)-pregnadien-11-one 21-oates which have the following structural formula—

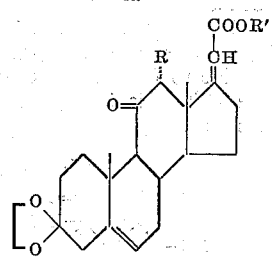

wherein R is alkyl and R' is hydrogen or alkyl.

Whereas the 12α-alkyl group is stable to base when the substituent at C–11 is an hydroxy group, the 12 alkyl group is isomerized to the 12β-position by base when there is a keto group at position 11. Consequently, reaction of the above alkyl-12α-alkyl-3-ethylenedioxy-5,17 (20)-pregnadien-11-one 21-oate with potassium hydroxide and isopropyl alcohol resulted after isolation and re-esterification at C–21 with diazoalkane in the formation of 12β-alkyl-3-ethylenedioxy-5,17(20)-pregnadien-11-one 21-oate which may be represented as follows; wherein the solid line denotes the 12β-position, and, wherein R is alkyl and R$_2$ is the same or different alkyl groups.

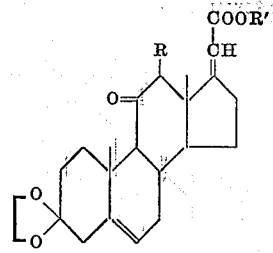

The alkyl 12β-alkyl-3-ethylenedioxy-5,17(20)-pregnadien-11-one 21-oate can be reduced with lithium aluminum hydride to form 12β-alkyl-3-ethylenedioxy-11β,21- dihydroxy-5,17(20)-pregnadiene which has the following formula—

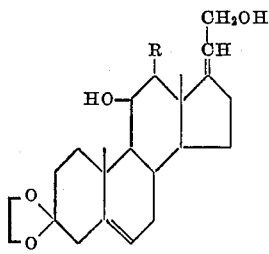

wherein R is alkyl.

Reaction of the 12β-alkyl-3-ethylenedioxy-11β-hydroxy-5,17(20)-pregnadiene with an acid under mild conditions such as dilute acid in a methanolic medium results in the removal of the ethylenedioxy group in the 3-position and there is obtained 12β-alkyl-11β,21-dihydroxy-4,17(20)-pregnadien-3-one which may be represented graphically as follows:

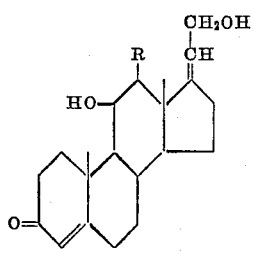

wherein R is alkyl.

Reaction of the above with an acyl anhydride results in the formation of the 21-acylate, namely, 12β-alkyl-11β, 21-dihydroxy-4,17(20)-pregnadien-3-one 21-acylate. The latter compound is then reacted with osmium tetroxide and hydrogen peroxide to form 12β-alkyl-11β,17α,21-trihydroxy-4-pregnene-3,20-dione 21-acylate which may be represented as follows:

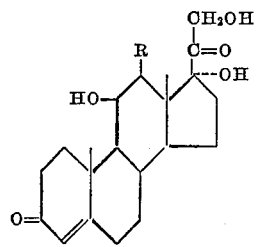

wherein R is as above.

This latter compound, namely, 12β-alkyl-11β,17α,21-trihydroxy-4-pregnene-3,20-dione 21-acylate may also be named 12β-alkyl-hydrocortisone acylate and possesses marked and effective anti-inflammatory activity.

The above 12β-alkyl-11β,17α,21-trihydroxy-4-pregnene-3,20-dione 21-acylate can be dehydrated with methanesulfonyl chloride in pyridine or dimethylformamide to form 12β-alkyl-17α,21-dihydroxy-4,9(11)-pregnadiene-3,20-dione 21-acylate which may be represented by the following structural formula—

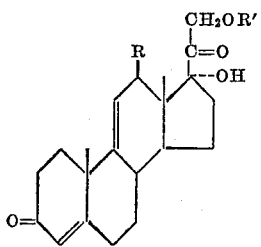

wherein R is alkyl and R' is hydrogen or acyl.

Treatment of the 12β-alkyl-17α,21-dihydroxy-4,9(11)-pregnadiene-3,20-dione 21-acylate with N-halosuccinimide in the presence of an acid catalyst results in the formation of 12β-alkyl-9α-halo-11,17α,21-trihydroxy-4-pregnene-3,20-dione 21-acylate which has the following structural formula:

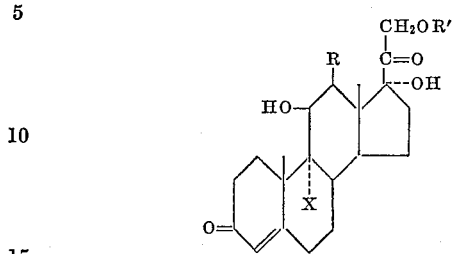

wherein R is alkyl, R' is hydrogen or acyl and X is bromo and chloro.

The 12β-alkyl-9α-halo-11,17α,21-trihydroxy-4-pregnene-3,20-dione 21-acylate is then reacted with sodium alkoxide to form 12β-alkyl-9β,11β-epoxy-17α,21-dihydroxy-4-pregnene-3,20-dione and reaction of the latter compound with an acyl anhydride in the presence of pyridine results in the formation of 12β-alkyl-9β,11β-epoxy-17α,21-dihydroxy-4-pregnene-3,20-dione 21-acylate which may be represented as follows:

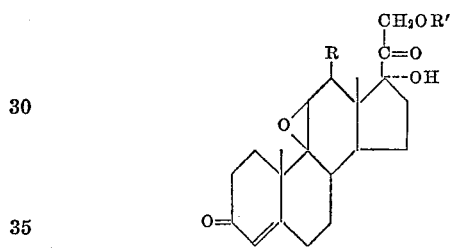

wherein R is alkyl and R' is hydrogen or acyl.

Reaction of the 12β-alkyl-9β,11β-epoxy-17α,21-dihydroxy-4-pregnene-3,20-dione 21-acylate with a hydrogen halide results in the formation of 12β-alkyl-9α-halo-11β, 17α,21-trihydroxy-4-pregnene-3,20-dione 21-acylate which has the following structural formula:

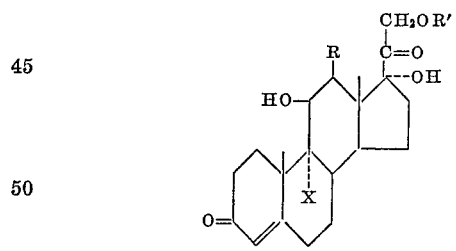

wherein R is alkyl, R' is hydrogen or acyl and X is chloro, fluoro or iodo.

This compound, namely, 12β-alkyl-9α-halo-11,17α,21-trihydroxy-4-pregnene-3,20-dione 21-acylate possesses anti-inflammatory activity.

The 12β-alkyl-11β,17α,21-trihydroxy-4-pregnene-3,20-dione 21-acylate having a hydrogen or halogen atom at the 9α-position can be reacted with selenium dioxide to form the corresponding 12β-alkyl-11β,17α,21-trihydroxy-1,4-pregnadiene-3,20-dione 21-acylate having a hydrogen or halogen atom at the 9α-position, which compound may be indicated graphically as follows:

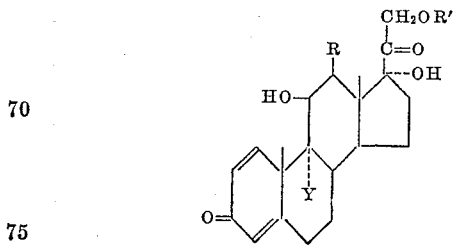

wherein R is alkyl, R' is hydrogen or acyl and Y is hydrogen or halogen.

Alternatively, the 1,4-pregnadiene compounds described above can be prepared from the corresponding 4-pregnene-3-ones microbially by means of *Bacillus sphaericus*.

Compounds discussed hereinbefore and having the following formula:

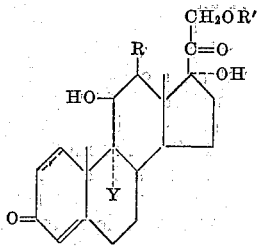

wherein R is alkyl, R' is hydrogen or acyl, Y is hydrogen or halogen and the broken line between positions 1 and 2 indicates that a double bond may be present in this position can be oxidized with chromium trioxide in the presence of pyridine to convert the 11β-hydroxy group to a keto group and the oxidation product can be represented by the following formula:

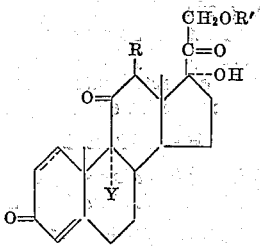

wherein R is alkyl, R' is hydrogen or acyl and Y is hydrogen or halogen.

Compounds of the following structure:

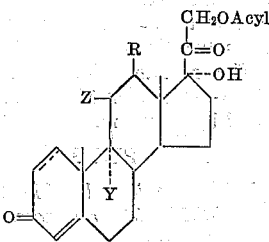

wherein R is alkyl, Y is hydrogen or halogen, Z is hydroxy or keto and the broken line between carbon atoms 1 and 2 indicate that a double bond may be present can be reacted with acid to form the corresponding 21-alcohol,

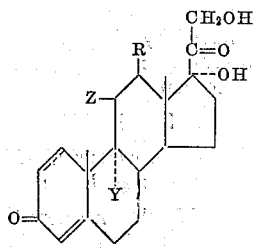

In addition, it has been found that where a 9α-fluoro 21-acylate or the 9α-hydrogen 21-acylate is hydrolyzed to the alcohol, sodium methoxide may be employed.

In all of the previously described reactions R has been designated as alkyl, and is intended to include the lower alkyl groups such as methyl, ethyl and propyl. R' has been indicated as hydrogen or acyl and the acyl groups that may be employed in these reactions include lower hydrocarbon carbonyl esters such as benzoate, lower alkanoates such as acetate, and propionate, Y is hydrogen or halogen and halogen is intended to include bromo, chloro iodo and fluoro. It will be evident to those skilled in the art that other groups may be substituted for those recited here and these definitions are intended only as some indication of the operable class of compounds intended.

The following experimental part illustrates in detail some of the compounds which constitute this invention and methods for their production. However, this invention is not to be construed as limited thereby in spirit or in scope since it will be apparent to those skilled in the art that many modifications in materials and methods may be made without departing from the invention.

EXAMPLE 1

*Preparation of Methyl 3-Ethylenedioxy-12α-Methyl-5,17(20)-Pregnadien-11-One-21-Oate*

1.25 grams of chromium trioxide was added in portions to 12.5 ml. of dry pyridine in the cold. To the mixture was added 1.25 g. of methyl 3-ethylenedioxy-11β-hydroxy-12α-methyl-5,17(20)-pregnadien-21-oate (prepared as described herein below) in 2.5 ml. of pyridine. The mixture stood at room temperature for about 16 hours and was then distributed between ether and water. The organic layer was washed with dilute hydrochloric acid, with water, with sodium bicarbonate and finally with saturated salt solution. Removal of the solvent afforded after crystallization the desired methyl-3-ethylenedioxy-12α-methyl-5,17(20)-pregnadien-11-one-21-oate.

The 3-ethylenedioxy-21-hydroxy-12α-methyl-5,17(20)-pregnadien 21-oate used as a starting material in this example is prepared, starting with the known 3α-acetoxy-12α-bromo-11,20-pregnanedione in accordance with the following procedure: A mixture of 50 g. of 3α-acetoxy-12α-bromo-11,20-pregnanedione, 5.18 liters of methanol and 51.8 ml. of concentrated hydrochloric acid was stirred for 20 hours at about 20° C. The reaction was quenched by adding a solution of 27.6 g. of sodium bicarbonate in 690 ml. of water with stirring. The product 12α-bromo-3α-hydroxy-11,20-pregnanedione, was isolated by removing the methanol in vacuo, adding 1 liter of water and filtering; M.P. 157–159° C.

To a solution of 39.78 g. of 12α-bromo-3α-hydroxy-11,20-pregnanedione in 971 ml. of methanol was added 9.71 ml. of dry pyridine. The flask was covered with a black cloth and continuously stirred at about 20° C. A solution of 75.7 g. of N-bromoacetamide in 971 ml. of methanol was added and the mixture was stirred for 20 hours. Twenty milliliters of allyl alcohol were added, followed by 3 liters of water. The product, 12α-bromo-3,11,20-pregnane-trione which crystallized on standing was filtered off; M.P. 189–191° C.

A solution of 39.98 g. of 12α-bromo-3,11,20-pregnane-trione, 1,075 g. of p-toluenesulfonic acid monohydrate, 24.6 ml. of freshly distilled ethylene glycol and 924 ml. of benzene, that had been previously dried over sodium, was slowly distilled through a Vigreux column for 5 hours, keeping the volume constant by adding dry benzene. The reaction was extracted twice with 5% sodium bicarbonate solution and washed once with water. It was dried over anhydrous sodium sulfate for about 16 hours, filtered and the filtrate concentrated in vacuo. The product, 12α-bromo-3,20-bis-[ethylenedioxy]-11-pregnanone was crystallized from acetone-methanol; M.P. 173–175° C.

A solution of 10 g. of 12α-bromo-3,20-bis-[ethylenedioxy]-11-pregnanone in 300 ml. of tetrahydrofuran was cooled to 0° C. The system was purged with nitrogen. A filtered solution of 8 g. of lithium borohydride in 600 ml. of tetrahydrofuran was added over a period of 45 minutes with stirring. The solution was allowed to come to room temperature slowly and was stirred at room temperature for three hours. A solution of 22 ml. of glacial acetic acid in 116 ml. of water was added. The tetrahydrofuran was removed in vacuo and 200 ml. of water was added. The aqueous layer was extracted three times with chloroform and the combined organic extracts were washed with 5% sodium bicarbonate and water and dried over anhydrous sodium sulfate overnight. It was filtered and the filtrate concentrated in vacuo; 12α-bromo-3,20-bis-[ethylenedioxy]-11β-hydroxy-pregnane was recovered.

To a solution of 19.5 g. of potassium hydroxide in 325 ml. of isopropanol, 6.51 g. of 12α-bromo-3,20-bis-[ethylenedioxy]-11β-hydroxypregnane were added and the system was purged with nitrogen. The reaction mixture was stirred for 1.5 hours at 55° C. and during this time a copious precipitate of potassium bromide formed. The reaction mixture was poured into the water, and was back-extracted three times with ether. The ether was back-extracted with water and dried over anhydrous sodium sulfate overnight. Filtered and concentrated in vacuo to a small volume; the resultant needles of 11β, 12β-epoxy-dione-3,20-bis-[ethylenedioxy]-pregnane were filtered off.

To 1.00 g. of 11β,12β-epoxy-3,20-bis-[ethylenedioxy]-pregnane was added 20.0 ml. of a dioxane solution of dimethylmagnesium (19.07 milliequivalents). All apparatus had been previously flame-dried under a stream of dry nitrogen. The solution was refluxed for sixteen hours under a nitrogen atmosphere. At the end of this time, a saturated solution of ammonium chloride was added until the gaseous evolution ceased upon addition of further amounts of the solution. The layers were separated and the aqueous layer was extracted three times with chloroform. The combined organic layers were washed with water, dried over anhydrous sodium sulfate overnight, filtered and concentrated to an oil in vacuo on the hot water bath. The oil thus obtained contained 3,20-bis-[ethylenedioxy]-11β-hydroxy-12α-methyl-pregnane.

To the oil containing 3,20-bis-[ethylenedioxy]-11β-hydroxy-12α-methylpregnane was added 270 ml. of methanol and 10.8 ml. of 8.5% sulfuric acid. The solution was refluxed for 1¼ hours under a nitrogen atmosphere and then cooled. Solid sodium bicarbonate was added until the solution was neutral. The solution was filtered and the methanol was removed in vacuo on the hot-water bath. Water was added and the aqueous layer was extracted three times with chloroform. The combined extracts were washed with water and dried over anhydrous sodium sulfate for 1¼ hours. They were filtered, concentrated to dryness in vacuo on the hot-water bath and crystallized from methanol-ether to yield 11β-hydroxy-12α-methyl-3,20-pregnanedione.

One hundred grams of 11β-hydroxy-12α-methyl-3,20-pregnanedione in 2 liters of chloroform and 225 ml. of acetic acid is cooled to −50° C. and brominated with 40.6 g. of bromine in 227 ml. of acetic acid. After one hour, 40.25 g. of sodium acetate in 300 ml. of water was added, the reaction mixture concentrated to 600 ml. and 4-bromo-11β-hydroxy-12α-methyl-3,20-pregnanedione was collected by filtration after the addition of 1 liter of water.

To a solution of 170 mg. of 4-bromo-11β-hydroxy-12α-methyl-3,20-pregnanedione in 2.0 ml. of dimethylformamide was added 51 mg. of anhydrous lithium chloride. The mixture was heated to 100° C. for 2 hours under a nitrogen atmosphere. One milliliter of water was added dropwise with stirring before cooling to 0° C. The 11β-hydroxy-12α-methyl-4-pregnene-3,20-dione was filtered off and dried; wt. 115 mg.

40 grams of 11β-hydroxy-12α-methyl-4-pregnene-3,20-dione was dissolved in 200 ml. of benzene and 14.6 g. of diethyl oxalate. After the addition of 5.6 g. of sodium methoxide, the mixture was stirred for two hours to form ethyl 11β,21-dihydroxy-12α-methyl-4-pregnene-3,20-dione 21-glyoxylate.

The ethyl 11β,21-dihydroxy-12α-methyl-4-pregnene-3,20-dione 2-glyoxylate was reacted with 32 g. of bromine in 100 ml. of benzene at 10° C. and kept at 10° C. for one hour to form ethyl 21,21-dibromo-11β-hydroxy-12α-methyl-4-pregnene-3,20-dione 21-glyoxylate.

The mixture containing ethyl 21,21-dibromo-11β-hydroxy-12α-methyl-4-pregnene-3,20-dione 21-glyoxylate was added to 500 ml. of 10% of methanolic sodium methoxide solution and maintained at room temperature for about 16 hours. After concentration of the reaction mixture to dryness, the residue was refluxed with 500 ml. of 5 N methanolic sodium hydroxide, the reaction mixture was diluted with water and concentrated to flush out methanol. Acidification yielded 11β-hydroxy-12α-methyl-3-oxo-4,17(20)-pregnadien-21-oic acid which was collected on filtration. After drying at room temperature, the 11β-hydroxy-12α-methyl-3-oxo-4,17(20)-pregnadien-21-oic acid was treated with excess ethereal diazomethane. After esterification was complete, the ethereal solution was chromatographed over acid-washed alumina to give 11β-hydroxy-12α-methyl-3-oxo-4,17(20)-pregnadien-21-oate.

10 grams of methyl 11β-hydroxy-12α-methyl-3-oxo-4,17(20)-pregnadien 21-oate was dissolved in 100 g. of ethylene glycol and 500 cc. of benzene, 0.25 g. of p-toluenesulfonic acid was added and the reaction mixture refluxed for 5 hours with a benzene-water separator. At the end of this period, 10 g. of sodium bicarbonate was added and the mixture poured into 1 liter of water. The resultant 3-ethylenedioxy-11β-hydroxy-12α-methyl-5,17(20)-pregnadien 21-oate was extracted into benzene, the benzene solution dried and concentrated to dryness.

EXAMPLE 2

*Preparation of 3-Ethylenedioxy-12β-Methyl-5,17(20)-Pregnadien-11-One 21-Oate*

The 3-ethylenedioxy-11β-hydroxy-12α-methyl-5,17(20)-pregnadien-11-one 21-oate was refluxed for three hours in a solution of potassium hydroxide in isopropyl alcohol. Water was added and the alcohol was removed by distillation. The pH was made acid to Congo red and the acid extracted into ethyl acetate. After removal of the solvent the residue was dissolved in methanol and esterified with diazomethane. The resulting methyl 3-ethylenedioxy-12β-methyl-5,17(20)-pregnadien-11-one 21-oate was crystallized and isolated by filtration.

EXAMPLE 3

*Preparation of 3-Ethylenedioxy-11β,21-Dihydroxy-12β-Methyl-5,17(20)-Pregnadiene*

The methyl 3-ethylenedioxy-12β-methyl-5,17(20)-pregnadien-11-one 21-oate was dissolved in 2 M lithium aluminum hydride in ether solution and kept at room temperature for about 16 hours, to form 3-ethylenedioxy-11β,21-dihydroxy-12β-methyl-5,17(20)-pregnadiene. The mixture was diluted with water and 2 N hydrochloric acid. The ether was removed by distillation and 3-ethylenedioxy-11β,21-dihydroxy-12β-methyl 5,17(20)-pregnadiene was collected by filtration.

EXAMPLE 4

*Preparation of 11β,21-Dihydroxy-12β-Methyl-4,17(20)-Pregnadien-3-One*

A solution of 2 g. of 3-ethylenedioxy-11β,21-dihydroxy-12β-methyl-5,17(20)-pregnadiene in 160 ml. of acetone was boiled briefly on the steam bath with 8 ml. of 1 N sulfuric acid. After neutralization 11β,21-dihydroxy-12β-methyl-4,17(20)-pregnadiene-3-one was obtained.

EXAMPLE 5

*Preparation of 11β,21-Dihydroxy-12β-Methyl-4,17(20)-Pregnadiene*

To the 11β,21-dihydroxy-12β-methyl-4,17(20)-pregnadien-3-one was added pyridine and acetic anhydride and 11β,21-dihydroxy-12β-methyl-4,17(20)-pregnadien-3-one 21-acetate was recovered.

EXAMPLE 6

*Preparation of 11β,17α,21-Trihydroxy-12β-Methyl-4-Pregnene-3,20-Dione 21-Acetate*

6.85 g. of the 11β,21-dihydroxy-12β-methyl-4,17(20)-pregnadien-3-one 21-acetate was dissolved in 200 ml. of t-butyl alcohol and reacted with 3 ml. of pyridine, 191 mg. of osmium tetroxide and 1.3 g. of hydrogen peroxide. After 4 days, the reaction mixture was stirred with 4.2 g. of sodium sulfite in 190 ml. of water, t-butyl alcohol was removed in vacuo and the product extracted with methylene chloride. Chromatography over diatomaceous earth yielded pure 11β,17α,21-trihydroxy-12β-methyl - 4 - pregnene-3,20-dione 21-acetate.

EXAMPLE 7

*Preparation of 17α,21-Dihydroxy-12β-Methyl-4,9(11)-Pregnadiene-3,20-Dione 21-Acetate*

An 11.07 g. aliquot of 11β,17α,21-trihydroxy-12β-methyl-4-pregnene-3,20-dione 21-acetate was dissolved in a mixture of 65 cc. of dimethylformamide and 11 cc. of pyridine in a dry 2-liter three-necked flask, fitted with a stirrer and reflux condenser. 5.55 cc. of methane-sulfonyl chloride was added at room temperature. The reaction mixture was held at 80–85° C. for one hour. The solution was chilled in an ice bath and treated successively with 110 cc. of methanol, 480 cc. of 5% aqueous sodium bicarbonate and finally with 360 cc. of water while stirring in an ice bath. The product 17α,21-dihydroxy-12β-methyl-4,9(11)-pregnadiene-3,20-dione 21-acetate was then removed by filtration without difficulty, washed repeatedly with water and dried to constant weight in a Moisture Teller at 50° C. (30 minutes).

EXAMPLE 8

*Preparation of 9α-Bromo-11β,17α,21-Trihydroxy-12β-Methyl-4-Pregnene-3,20-Dione 21-Acetate*

To a suspension of a 9.03 g. aliquot of the above 17α,21 - dihydroxy - 12β - methyl - 4,9(11) - pregnadiene-3,20-dione 21-acetate in 114 cc. of acetone was added at 0° C. with stirring 5.93 g. of N-bromosuccinimide (96% by titration) and then 20.4 cc. of a perchloric acid solution prepared by dissolving 0.548 cc. of 70% perchloric acid in 33 cc. of water. The mixture was stirred at 0° C. for 4¾ hours. The excess of N-bromosuccinimide was destroyed by the addition of allyl alcohol (40 drops) and 500 cc. of water was then added with a stirring over a 3–5 minute interval. The mixture was held at 0° C. for an additional hour. The 9α-bromo-11β,17α,21-trihydroxy-12β-methyl-4-pregnene-3,20-dione 21-acetate was removed by filtration, washed repeatedly with water and dried in a desiccator over sulfuric acid.

EXAMPLE 9

*Preparation of 9β,11β-Epoxy-17α,21-Dihydroxy-12β-Methyl-4-Pregnene-3,20-Dione 21-Acetate*

A 10.48 g. aliquot of 9α-bromo-11β,17α,21-trihydroxy-12β-methyl-4-pregnene-3,20-dione 21-acetate was dissolved in 76.5 cc. of tetrahydrofuran (which had been briefly stored over potassium hydroxide) and 38 cc. of purified methanol. The mixture was treated with 25.8 cc. 0.91 N sodium methoxide in methanol in a nitrogen atmosphere at 24° C. for 5 minutes. The base was neutralized by the addition of an excess (1.58 cc.) of glacial acetic acid which resulted in a color change from red to dark yellow. The solvents were removed in vacuo at 45–48° C. bath-temperature. The residue was flushed with chloroform and then with a petroleum ether. The residue was suspended in 48 cc. of pyridine and 24 cc. of acetic anhydride and heated under nitrogen at 65° C. for 1⅓ hours. After removal of the reagents in vacuo (bath temperature up to 70° C. oil pump) the solid residue was flushed with petroleum ether. About 80 cc. of water was added and 9β,11β-epoxy-17α,21-dihydroxy-12α-methyl-4-pregnene 3,20-dione 21-acetate was filtered off and washed thoroughly with water. The crude product was dissolved in 88 cc. of acetone, was treated with 1 g. of activated carbon and filtered. The activated carbon was washed free of the 9β,11β-epoxy-17α,21-dihydroxy-12β-methyl-4-pregnene-3,20-dione 21-acetate. The clear, filtrate was concentrated on a steambath in a current of nitrogen and treated with petroleum ether. Filtration and washing with acetone petroleum ether (1:10) gave the 9β - 11β - epoxy - 17α,21 - dihydroxy - 12β - methyl - 4-pregnene-3,20-dione 21-acetate.

EXAMPLE 10

*Preparation of 9α-Fuoro-11β,17α,21-Trihydroxy-12β-Methyl-4-Pregnene-3,20-Dione 21-Acetate*

To a solution of 6.96 g. of anhydrous hydrogen fluoride in 13.24 g. of tetrahydrofuran and 5 ml. of chloroform chilled to about −60° C. was added a solution of 4.018 g. of 9β,11β - epoxy - 17α,21 - dihydroxy - 12β - methyl - 4-pregnene-3,20-dione 21-acetate in 25 ml. of chloroform likewise chilled at about −60° C. The hydrogen fluoride tetrahydrofuran reagent was immersed in an acetone-Dry Ice bath while the steroid was being added. An additional 5 ml. of chloroform was used to aid in the transfer of the epoxide. The reaction mixture was removed from the acetone-Dry Ice bath and subsequently maintained at −30° C. for four hours and then added at a suitable rate to a well agitated mixture of an aqueous solution of potassium carbonate, chloroform and ice. The weakly alkaline aqueous layer was separated and twice back extracted with chloroform. The combined organic layers were washed with water. After removal of the solvent in vacuo the residue was heated with 5 ml. of pyridine and 3 ml. of acetic anhydride at 65° C. under nitrogen for 75 minutes to convert any byproduct into a less polar diacyl derivative. The bulk of the solvents was removed in vacuo, and the residue was distributed between chloroform and dilute hydrochloric acid. The aqueous layer was back-extracted twice with chloroform. The combined organic layers were washed with dilute acid, with water, with a solution of bicarbonate and finally with water. The filtered solution was concentrated in vacuo to a small volume and purified by passage through a column of neutral alumina (16 g.). The eluates, amounting to 85 ml. of chloroform, were concentrated and the fluorohydrin was obtained by the addition of benzene. One recrystallization from acetone-petroleum ether afforded 9α-fluoro-11β,17α,21-trihydroxy-12β-methyl-4-pregnene-3,20-dione 21-acetate.

EXAMPLE 11

*Preparation of 9α-Fluoro-11β,17α,21-Trihydroxy-12β-Methyl-4-Pregnene-3,20-Dione*

To a stirred solution of 100 mg. of 9α-fluoro-11β,17α,21 - trihydroxy - 12β - methyl - 4 - pregnene - 3,20 - dione 21-acetate in 5 ml. of methanol under nitrogen at 25° C. was added 1.00 ml. of 0.25 M methanolic sodium methoxide. After 15 minutes 0.2 ml. of acetic acid in 1 ml. of water was added and the mixture concentrated nearly to dryness. The residue was taken up in ethyl acetate and the ethyl acetate solution was washed with water, dried over magnesium sulfate, and concentrated to dryness. Crystallization of the residue from ethyl acetate gave 9α - fluoro - 11β,17α,21 - trihydroxy - 12β-methyl - 4-pregnene-3,20-dione.

EXAMPLE 12

*Preparation of 9α-Chloro-11β,17α,21-Trihydroxy-12β-Methyl-4-Pregnene-3,20-Dione 21-Acetate*

To a solution of 100 mg. of 9β,11β-epoxy-17α,21-dihydroxy - 12β - methyl - 4 - pregnene - 3,20 - dione 21-acetate prepared as in Example 9 in 4 ml. of chloroform was added 5 ml. of concentrated hydrochloric acid. The two phase mixture was stirred at 25° C. for 1 hour, addition of water and chloroform extraction gave a crude crystalline product which is partly deacetylated. Treatment with 1 ml. of pyridine and 0.5 ml. of acetic anhydride at 25° C. for 18 hours followed by concentration in vacuo and crystallization of the residue from acetone-ether afforded pure 9α-chloro-11β,17α-21-trihydroxy-12β-methyl-4-pregnene-3,20-dione 21-acetate.

EXAMPLE 13

*Preparation of 9α-Chloro-11β,17α,21-Trihydroxy-12β-Methyl-4-Pregnene-3,20-Dione*

A solution of 250 mg. of 9α-chloro-11β,17α,21-trihydroxy-12β-methyl-4-pregnene-3,20-dione 21-acetate in 5 ml. of 0.25 N perchloric acid in methanol was stirred for about 18 hours at room temperature to produce 9α-chloro-11β,17α,21 - trihydroxy - 12β - methyl - 4 - pregnene-3,20-dione which is recovered by adding water to the reaction mixture and allowing the product to crystallize.

EXAMPLE 14

*Preparation of 11β,17α,21-Trihydroxy-12β-Methyl-1,4-Pregnadiene-3,20-Dione 21-Acetate*

To 100 mg. of 11β,17α,21-trihydroxy-12β-methyl-4-pregnene-3,20-dione 21-acetate (prepared as in Example 6) in 5 ml. of t-butanol and 0.1 ml. of acetic acid was added 50 mg. of selenium dioxide. The mixture was refluxed under nitrogen for 18 hours, 50 mg. of selenium dioxide was added and the mixture refluxed for an additional 24 hours. The mixture was filtered and the filtrate taken to dryness. The residue was taken up in ethyl acetate and washed successively with aqueous sodium bicarbonate, ammonium sulfide, dilute ammonia water, water, dilute hydrochloric acid and water and dried over magnesium sulfate. It was then treated with activated charcoal and concentrated to dryness. Crystallization of the residue from acetone-ether gave pure 11β,17α,21-trihydroxy-12β-methyl-1,4-pregnadiene-3,20-dione 21-acetate.

EXAMPLE 15

*Preparation of 11β,17α,21-Trihydroxy-12α-Methyl-1,4-Pregnadiene-3,20-Dione*

11β,17α,21 - trihydroxy - 12β - methyl-1,4-pregnadiene-3,20-dione 21-acetate can be reacted with methanolic sodium methoxide to produce the alcohol namely 11β,17α,21 - trihydroxy - 12β - methyl - 1,4 - pregnadiene - 3,20-dione. This procedure is described in Example 11.

EXAMPLE 16

Alternatively, the 1,2-dehydrogenation of 11β,17α,21-trihydroxy-12β-methyl-4-pregnene-3,20-dione 21-acetate can be carried out microbiologically by means of *Bacillus sphaericus* to yield 11β,17α,21-trihydroxy-12β-methyl-1,4-pregnadiene-3,20-dione which on acetylation with acetic anhydride-pyridine gives 11β,17α,21-trihydroxy-12β-methyl-1,4-pregnadiene-3,20-dione 21-acetate.

EXAMPLE 17

*Preparation of 9α-Fluoro-11β,17α,21-Trihydroxy-12β-Methyl-1,4-Pregnadiene-3,20-Dione 21-Acetate*

In a similar manner, 100 mg. of 9α-fluoro-11β,17α,21-trihydroxy-12β-methyl-4-pregnene-3,20-dione 21-acetate (prepared as described in Example 14) was treated selenium dioxide to produce the corresponding 9α-fluoro-11β,17α,21 - trihydroxy - 12β - methyl - 1,4 - pregnadiene-3,20-dione 21-acetate.

EXAMPLE 18

*Preparation of a 9α-Fluoro-11β,17α,21-Trihydroxy-12β-Methyl-1,4-Pregnadiene-3,20-Dione*

The 21-alcohol was prepared from the 21-acetate. To a stirred solution of 100 mg. of 9α-fluoro-11β,17α,21-trihydroxy-12β-methyl-1,4-pregnadiene-3,20-dione 21-acetate in 5 ml. of methanol under nitrogen at 25° C. was added 1.00 ml. of 0.26 M methanolic sodium methoxide. After 15 minutes 0.2 ml. of acetic acid in 1 ml. of water was added and the mixture concentrated nearly to dryness. The residue was taken up in ethyl acetate and the ethyl acetate solution was washed with water dried over magnesium sulfate, and concentrated to dryness. Crystallization of the residue from ethyl acetate gave 9α-fluoro-11β, 17α,21-trihydroxy-12β-methyl-1,4-pregnadiene-3,20-dione.

EXAMPLE 19

*Preparation of 9α-Chloro-11β,17α,21-Trihydroxy-12β-Methyl-1,4-Pregnadiene-3,20-Dione 21-Acetate*

To a solution of 100 mg. of 9β,11β-epoxy-17α,21-dihydroxy-12β-methyl - 4 - pregnene-3,20-dione 21-acetate (prepared as described in Example 9) in 4 ml. of chloroform was added 5 ml. of concentrated hydrochloric acid. The two-phase mixture was stirred at 25° C. for 1 hour. Addition of water and chloroform extraction gave a crude crystalline product which is partly deacetylated. Treatment with 1 ml. of pyridine and 0.5 ml. of acetic anhydride at 25° C. for 18 hours followed by concentration in vacuo and crystallization of the residue from acetone-ether afforded 9α-chloro-11β,17α,21-trihydroxy-12β-methyl-1,4-pregnadiene-3,20-dione 21-acetate.

EXAMPLE 20

*Preparation of 9α-Chloro-11β,17α,21-Trihydroxy-12β-Methyl-1,4-Pregnadiene-3,20-Dione*

The 21-alcohol can be prepared from the 9α-chloro-11β,17α,21 - trihydroxy - 12β - methyl - 1,4 - pregnadiene-3,20-dione 21-acetate as in Example 13.

EXAMPLE 21

*Preparation of 17α,21-Dihydroxy-12β-Methyl-4-Pregnene-3,11,20-Trione 21-Acetate*

1 gram of chromium trioxide was added in portions of 10 ml. of dry pyridine in the cold. To the mixture was added 1 g. of 11β,17α,21-trihydroxy-12β-methyl-4-pregnene-3,20-dione 21-acetate (prepared as described in Example 6) in 2 ml. of pyridine. The mixture stood at 20° C. for about 16 hours and was then distributed between ether and water. The organic layer was washed with dilute hydrochloric acid, with water and sodium bicarbonate and finally with saturated salt solution. Removal of the solvent afforded after crystallization the desired 17α,21-dihydroxy-12β-methyl - 4 - pregnene-3,11,20-trione 21-acetate.

EXAMPLE 22

*Preparation of 17α,21-Dihydroxy-12β-Methyl-4-Pregnene-3,11,20-Trione*

17α,21-dihydroxy-12β-methyl-4-pregnene-3,11,20-trione 21-acetate can be converted to the 21-alcohol by the procedure described in Example 11.

EXAMPLE 23

*Preparation of 9α-Fluoro-17α,21-Dihydroxy-12β-Methyl-4-Pregnene-3,11,20-Trione 21-Acetate*

1.25 grams of chromium trioxide was added in portions to 12.5 ml. of dry pyridine in the cold. To the mixture was added 1.25 g. of 9α-fluoro-11,17α,21-trihydroxy-12β-methyl-4-pregnene-3,20-dione 21-acetate (prepared as described in Example 10) in 2.5 ml. of pyridine. The mixture stood at 20° C. for about 16 hours and was then distributed between ether and water. The organic layer was washed with dilute hydrochloric acid, with water, with sodium bicarbonate and finally with saturated salt solution. Removal of the solvent afforded after crystallization the desired 9α-fluoro-17α,21-dihydroxy-12β-methyl-4-pregnene-3,11,20-trione 21-acetate.

EXAMPLE 24

*Preparation of 17α,21-Dihydroxy-12β-Methyl-1,4-Pregnadiene-3,11,20-Trione 21-Acetate*

2 grams of chromium trioxide was added in portions of 10 ml. of dry pyridine in the cold. To the mixture was added 1 g. of 11β,17α,21-trihydroxy-12β-methyl-1,4-pregnadiene 3,20-dione 21-acetate (prepared as described in Example 14) in 4 ml. of pyridine. The mixture stood at 20° C. for about 16 hours and was then distributed between ether and water. The organic layer was washed with dilute hydrochloric acid, with water and sodium bicarbonate and finally with saturated salt solution. Removal of the solvent afforded after crystallization the desired 17α,21-dihydroxy-12β-methyl-1,4-pregnadiene-3,11,20-trione 21-acetate.

EXAMPLE 25

*Preparation of 9α-Fluoro-17α,21-Dihydroxy-12β-Methyl-1,4-Pregnadiene-3,11,20-Trione 21-Acetate*

1.00 gram of chromium trioxide was added in portions to 12.5 ml. of dry pyridine in the cold. To the mixture was added 1 g. of 9α-fluoro-11β,17α,21-trihydroxy-12β-methyl-1,4-pregnadiene-3,20-dione 21-acetate (prepared as described in Example 17) in 2 ml. of pyridine. The mixture stood at 20° C. for about 16 hours and was then distributed between ether and water. The organic layer was washed with dilute hydrochloric acid, with water, with sodium bicarbonate and finally with saturated salt solution. Removal of the solvent afforded after crystallization the desired 9α-fluoro-17α,21-dihydroxy-12β-methyl-1,4-pregnadiene-3,11,20-trione 21-acetate.

EXAMPLE 26

*Preparation of 9α-Chloro-17α,21-Dihydroxy-12β-Methyl-1,4-Pregnadiene-3,11,20-Trione 21-Acetate*

2.00 grams of chromium trioxide was added in portions to 25 ml. of dry pyridine in the cold. To the mixture was added 1 gram of 9α-chloro-11β,17α,21-trihydroxy-12β-methyl-1,4-pregnadiene-3,20-dione 21-acetate (prepared as described in Example 19) in 2 ml. of pyridine. The mixture stood at 20° C. for 16 hours and was then distributed between ether and water. The organic layer was washed with dilute hydrochloric acid, with water, with sodium bicarbonate and finally with saturated salt solution. Removal of the solvent afforded after crystallization the desired 9α-chloro-17α,21-dihydroxy-12β-methyl-1,4-pregnadiene-3,11,20-trione 21-acetate.

EXAMPLE 27

*Preparation of 9α-Chloro-17α,21-Dihydroxy-12β-Methyl-1,4-Pregnadiene-3,11,20-Trione*

The 9α-chloro-17α,21-dihydroxy-12β-methyl-1,4-pregnadiene-3,11,20-trione 21-acetate can be converted to the 21-alcohol by the procedure described in Example 13.

Various changes and modifications may be made in the present invention, certain preferred embodiments of which are herein disclosed, without departing from the scope thereof; to the extent that these changes and modifications are within the scope of the appended claims, they are to be considered a part of this invention.

We claim:

1. The process which comprises reacting alkyl 12α-alkyl-3-ethylenedioxy-5,17(20)-pregnadien-11-one 21-oate with alkali metal hydroxide and then with diazoalkane to form alkyl 12β-alkyl-3-ethylenedioxy-5,17(20)-pregnadien-11-one 21-oate.

2. The process which comprises reacting methyl 3-ethylenedioxy-5,17(20)-pregnadien-11-one 21-oate with potassium hydroxide in the presence of isopropyl alcohol and then with diazomethane to form methyl 3-ethylenedioxy-12β-methyl-5,17(20)-pregnadien-11-one 21-oate.

References Cited in the file of this patent

UNITED STATES PATENTS

| | | |
|---|---|---|
| 2,744,122 | Djerassi et al. | May 1, 1956 |
| 2,752,366 | Hogg | June 26, 1956 |
| 2,759,951 | Djerassi | Aug. 21, 1956 |
| 2,837,464 | Nobile | June 3, 1958 |
| 2,842,568 | Herz et al. | July 8, 1958 |
| 2,848,464 | Fried | Aug. 19, 1958 |

OTHER REFERENCES

Fried: "J.A.C.S.," vol. 76, page 1456 relied on.